3,309,329
BITUMINOUS COMPOSITIONS CONTAINING AMORPHOUS POLYPROPYLENE AND AN ETHYLENE-VINYL ACETATE COPOLYMER
Gerhart Schultz, Frankfurt am Main, and Guido Max Rudolf Lorentz, Oes, near Butzbach, Germany, assignors to Farbwerke Hoechst Aktiengesellschaft vormals Meister Lucius & Bruning, Frankfurt am Main, Germany, a corporation of Germany
No Drawing. Filed Dec. 3, 1962, Ser. No. 241,560
Claims priority, application Germany, Dec. 7, 1961, F 35,492
6 Claims. (Cl. 260—28.5)

It has been known to use high polymeric hydrocarbons, for example polyethylenes, as additives for bituminous masses. It has also been known to use caoutchouc as additive for bitumen and asphalt, in which connection there is understood by "caoutchouc" both synthetic caoutchouc and natural caoutchouc. Both types of additives entail disadvantages. Polyethylenes are compatible with bitumen to a limited extent only. Although the polyethylenes increase the dropping point, they diminish the breaking point (according to Fraas). Moreover, an addition of polyethylene deteriorates the resistance to aging of the bituminous mixtures. After exposure to ultra-violet irradiation, the masses tend to become brittle in an increased degree. When using caoutchouc large amounts of additives are required in order to attain good effects.

Now we have found that bituminous binding agents such as bitumen, tars and asphalts can readily be plastified by the addition thereto of small amounts of a mixture of amorphous, polymeric hydrocarbons, especially thermally degraded polypropylenes and predominantly amorphous copolymers of unsaturated hydrocarbons with unsaturated organic compounds containing at least one oxygen atom per molecule, especially copolymers of ethylene and vinyl acetate, preferably those having a vinyl acetate content of 25 to 50 percent by weight.

The range of plasticity of the bituminous binding agents is considerably enlarged by the additives, i.e. both the dropping point and the softening point are increased. The breaking point (according to Fraas), however, is decreased. The addition of the aforementioned high molecular substances in small quantities, i.e. in amounts ranging from 1 to 10 percent by weight, preferably 2 to 4 percent by weight, in each case, calculated on the bituminous binding agent for each component, brings about the plastification of the bitumen without incorporating therein a so-called migrating substance. There is no fear, therefore, of a disintegration or exudation of the substances added. This property is especially important when bringing together bitumen with sheets of plastic materials which are sensitive to plastifiers, e.g. sheets of unplastified polyvinyl chloride or sheets of polyisobutylene.

When using these novel additives, therefore, there is neither a risk that the sheet absorbs the plastifier nor that the bituminous mass becomes brittle by the disintegration or exudation of the plastifier. The system always maintains the desired plasticity.

Another advantage is that the additives are well compatible with bitumen. They are easy to incorporate and remain homogeneous. This is especially important when the masses are admixed with fillers, such as stone powder or stone splinters of all kind. Such masses containing fillers are often fabricated in the heat. In this case it is especially important that disintegration does not take place. It was found to be very advantageous that the masses according to the invention always maintain their homogeneity even on repeated heating in the fusion kettle. It is of special advantage that the additives according to the invention can withstand temperatures of up to 250° C. so that they are permanently capable of withstanding the melting process.

This constitutes an important advantage over the additives resembling caoutchouc which, as is well-known, are not capable of permanently withstanding the high melting temperatures normally applied in the case of bitumen. In comparison with the other known additives, the additives according to the invention are not only capable of influencing the plasticity range in a higher degree but they also possess an increased stability against ultra-violet irradiation which is shown in the following Table 1 in which:

VA 40 is an amorphous ethylene/vinyl acetate copolymer with a vinyl acetate content of 38 percent by weight, a flowing/dropping point of 71.5/86.5° C., a melt viscosity of 43,500 centistokes at 120° C., a density of 0.953 at 20° C., which was obtained by copolymerizing the two components under elevated pressure in the presence of free radical-forming compounds (for example according to the process of German Patent 912,267). The product does not contain crystalline portions (penetrometer number: 66; measured according to German Industrial Standards 51,579).

CP signifies cracked polypropylene obtained by thermal degradation of amohphous polypropylene, according to the process of Belgian Patent 616,420, which after cracking has a flowing/dropping point of 154/155° C. and a viscosity of 120 centipoises at 180° C. The process of the Belgian patent involves heating a viscous to semi-solid polypropylene polymer having a substantially rubber-like character and a density within the range of 0.82 to 0.89, a melt viscosity at 120° C. within the range of 10,000 to 1,000,000 centistokes and an average molecular weight within the range of 3,000 to 20,000 at a temperature within the range of from 280° to 400° C. for a period of from 1 to 150 minutes to obtain an amorphous polypropylene with the desired properties such as viscosity and density.

TABLE 1

| Type of bitumen | Additive | Dropping point,[1] ° C. | Softening point,[2] ° C. | Breaking point,[3] ° C. | Indentation depth [4] after 55 seconds in mm. at— | | | |
|---|---|---|---|---|---|---|---|---|
| | | | | | 20° C. | 40° C. | 60° C. | 80° C. |
| Bitumen 45 (German Industrial Standards 1995). | None | 78/78 | 52.6/52.6 | −7 | 72.2 | 25.7 | | |
| | 2.5− VA 40 | } 110/112 | } 67.0/67.2 | −12 | { 3.8 | 7.0 | 31.5 | |
| | 2.5− CP | | | | 3.8 | 7.0 | 32.0 | |
| Hot Bitumen (Blown Bitumen 85/25). | None | 100/100 | 78/78 | −10 | { 4.1 | 6.4 | 26.0 | 31.0 |
| | | | | | 4.1 | 6.4 | 26.0 | 31.2 |
| | 2.5− VA 40 | } 136/137 | } 86/86 | −15 | { 3.4 | 5.4 | 24.0 | 30.0 |
| | 2.5− CP | | | | 3.4 | 5.5 | 24.0 | 30.0 |

[1] According to Ubbelhode (German Industrial Standards 1995 U3).
[2] According to ring and ball (German Industrial Standards 1995 U4).
[3] According to Fraas (German Industrial Standards 1995 U6).
[4] German Industrial Standards 1995 U7.

The resistance to aging of these mixtures is shown below.

TABLE 2

| Hot bitumen (blown bitumen 85/25) | Measurements shortly after mixing (° C.) | Measurements after 18 days' storage at 50° C in a conditioning cabinet with exposure to intense ultra-violet irradiation (° C.) |
|---|---|---|
| Dropping point: | | |
| Without additive | 100 | 105 |
| According to footnote 1, Table 1 | 136 | 135 |
| Softening point: | | |
| Without additive | 78 | 86 |
| According to footnote 2, Table 1 | 85 | 88 |
| Breaking point (according to Fraas): | | |
| Without additive | −10 | −8.5 |
| According to footnote 3, Table 1 | −15 | −14.5 |

Table 2 shows that the bitumen containing no additive has undergone a considerable change already after a 450 hours' storage at 50° C. with ultra-violet irradiation.

We claim:

1. Composition of matter consisting essentially of a bituminous binding agent, 1–10 percent by weight, calculated on the bituminous binding agent, of an amorphous cracked polypropylene having a viscosity in the melt after cracking of 120 centipoises at 180° C. and 1–10 percent by weight, calculated on the bituminous binding agent, of an amorphous copolymer of ethylene and vinyl acetate having a vinyl acetate content of 25–50 percent by weight, calculated on the copolymer.

2. Composition of matter consisting essentially of a bituminous binding agent, 2–4 percent by weight, calculated on the bituminous binding agent, of an amorphous cracked polypropylene having a viscosity in the melt after cracking of 120 centipoises at 180° C. and 2–4 percent by weight, calculated on the bituminous binding agent, of an amorphous copolymer of ethylene and vinyl acetate having a vinyl acetate content of 30–40 percent by weight, calculated on the copolymer.

3. A composition according to claim 1 wherein said bituminous binding agent is a member selected from the group consisting of bitumen, tar and asphalt.

4. A composition according to claim 3 wherein said bituminous binding agent is bitumen.

5. A composition according to claim 3 wherein said bituminous binding agent is tar.

6. A composition according to claim 3 wherein said bituminous binding agent is asphalt.

References Cited by the Examiner

UNITED STATES PATENTS

| 2,490,550 | 12/1949 | Sermattei | 260—28.5 |
| 2,909,498 | 10/1959 | Sayko | 260—28.5 |
| 2,994,679 | 8/1961 | Jones et al. | 260—33.6 |
| 3,205,186 | 9/1965 | Zaayenga | 260—28.5 |

FOREIGN PATENTS 582,093   11/1946   Great Britain.

MORRIS LIEBMAN, *Primary Examiner.*

D. C. KOLASCH, J. A. GAZEWOOD, B. A. AMERNICK, *Assistant Examiners.*